Figure 1:
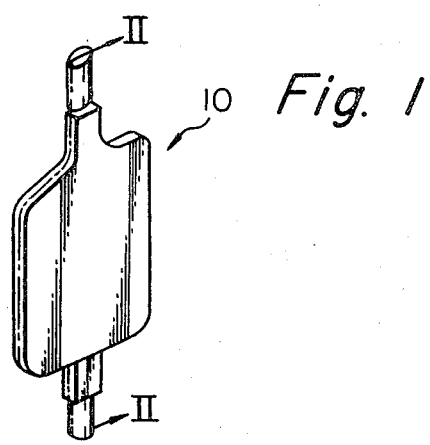

United States Patent
Yoshimura et al.

[15] 3,679,944
[45] July 25, 1972

[54] SOLID CAPACITOR WITH ELECTROLYTE CONTAINING ORGANIC MATERIAL AND METHOD FOR PRODUCING SAME

[72] Inventors: Susumu Yoshimura; Yoshimasa Ito; Shirow Asakawa; Katsue Hasegawa, all of Kadoma, Japan

[73] Assignee: Matsushita Electric Industrial Company, Limited, Osaka, Japan

[22] Filed: Sept. 20, 1971

[21] Appl. No.: 181,971

[52] U.S. Cl.................................317/230, 29/570, 252/62.2
[51] Int. Cl. ........................................................H01g 9/05
[58] Field of Search...................317/230, 231, 233; 29/570

[56] References Cited

UNITED STATES PATENTS

| | | | |
|---|---|---|---|
| 3,214,648 | 10/1965 | Ross et al. | 317/230 |
| 3,214,650 | 10/1965 | Ross et al. | 317/230 |
| 3,483,438 | 12/1969 | Sharbaugh | 317/230 |

Primary Examiner—James D. Kallam
Attorney—John Lezdey et al.

[57] ABSTRACT

A capacitor and method for preparing the same, which includes a solid electrolyte containing a 7,7,8,8-tetracyanoquinodimethane complex and a polymer which does not dissolve the 7,7,8,8-tetracyanoquinodimethane complex but disperses the same. The capacitor comprises an oxide coated anode electrode, a cathode electrode spaced from the oxide coated anode electrode and a solid electrolyte containing the 7,7,8,8-tetracyanoquinodimethane complex, and the polymer up to 40 percent by weight of the solid electrolyte and having the 7,7,8,8-tetracyanoquinodimethane complex dispersed therein. The method comprises the steps of preparing an electrode having a dielectric oxide film on its surface and a second electrode, pulverizing a 7,7,8,8-tetracyanoquinodimethane complex into fine particles having particle size of 0.1 to 1 $\mu$m, mixing the fine particles of the 7,7,8,8-tetracyanoquinodimethane complex and a solvent for the polymer for dispersing the fine particles of the tetracyanoquinodimethane complex into a solution by a suitable method, coating the oxide film with the dispersed solution, evaporating the solvent for forming a solid electrolyte layer on the film, and contacting the second electrode to the solid electrolyte layer.

11 Claims, 2 Drawing Figures

PATENTED JUL 25 1972

3,679,944

INVENTORS
SUSUMU YOSHIMURA, YOSHIMASA ITO, SHIROW ASAKAWA + KATSUE HASEGAWA
BY John Lezelley
ATTORNEY

3,679,944

SOLID CAPACITOR WITH ELECTROLYTE CONTAINING ORGANIC MATERIAL AND METHOD FOR PRODUCING

This invention relates to a solid electrolyte capacitor and a method for producing such capacitor. The capacitor to which this invention is directed uses a solid electrolyte including 7,7,8,8-tetracyanoquinodimethane and a complex of 7,7,8,8-tetracyanoquinodimethane which is dispersed in a polymer. The 7,7,7,8-tetracyanoquinodimethane and the complex of 7,7,8,8-tetracyanoquinodimethane are hereinafter referred to simply as TCNQ and TCNQ complex, respectively, for the save of brevity.

TCNQ or its complex has recently proved useful in a solid electrolyte for its ionic conductivity and considerably high oxidizability. TCNQ has a plain molecule structure and a strong electron affinity so that, when mixed with or melted in another suitable material, molecules of the former withdraw electrons from molecules of the latter, both thus being bonded together. If the other material has a property to readily release its electrons, the TCNQ molecules more easily withdraw the electrons from the molecules of the other material and are ionically bonded to the molecules of the other material. TCNQ is combined with a suitable material in this manner so that various TCNQ complexes are produced which have different types of complexes depending upon the ionization potential of the other material. These complexes are generally called electron-donor acceptor (EDA) complexes.

The EDA complexes based on TCNQ have now been thought of to be electronic conductors, but are not known to have their ionic conductivity and considerably high oxidizability.

Various solid electrolytes including TCNQ or TCNQ complexes are, therefore, developed. One of such electrolyte comprises a TCNQ complex alone and, as a result, fails to exhibit a sufficient film forming property. Another is the one which disclosed in U.S. Pat. No. 3,483,438, comprising a nitrogen-containing polymer, and TCNQ and a TCNQ complex of less than 20 percent by weight dissolved in the polymer.

The nitrogen-containing polymers which is capable of dissolving TCNQ and TCNQ salt are limited to several kinds, e.g., a polymer of acrylonitrile, methacrylonitrile and vinylpyridine, polymeric urethan, and copolymers of these compounds with each other or with other polymerizable monomers not necessarily containing nitrogen.

Furthermore, the great proportion of the polymer in this electrolyte adversely affects the property of TCNQ and TCNQ salt so that the electrolyte has the following drawbacks where used as a solid electrolyte capacitor:

1. a high specific resistance inviting an increased dielectric loss;
2. a low yield of capacitance;
3. an insufficient anodizability;
4. a dielectric constant dictated solely by the dielectric constant of the polymer;
5. a high expansion characteristics, resulting from the high expansion coefficient of the polymer.

It is therefore an object of this invention to provide an improved solid electrolyte capacitor which overcomes the above disadvantages of the prior type solid electrolyte capacitor.

It is another object of this invention to provide an improved solid electrolyte capacitor which has a solid electrolyte including a mixture of an organic semiconductive compound and a polymer, in which the polymer does not dissolve the organic semiconductive compound but disperses the same satisfactorily finely.

It is another object of this invention to provide an improved solid electrolyte capacitor which can be of any conventional configuration.

It is still another object of this invention to provide an improved solid electrolyte capacitor which has a fully non-porous, mechanically strong, solid electrolyte as an electrode on the exposed surface of the dielectric oxide film formed on the other electrode of the capacitor.

It is yet another object of this invention to provide a solid electrolyte capacitor having a organic semiconductive compound ground into fine particles.

It is still another object of this invention to provide a solid electrolyte capacitor having a solid electrolyte which contains less than 40 percent by weight of polymer.

It is still another object to provide a method adapted to produce the solid electrolyte capacitor having the above described features.

Figure 2:
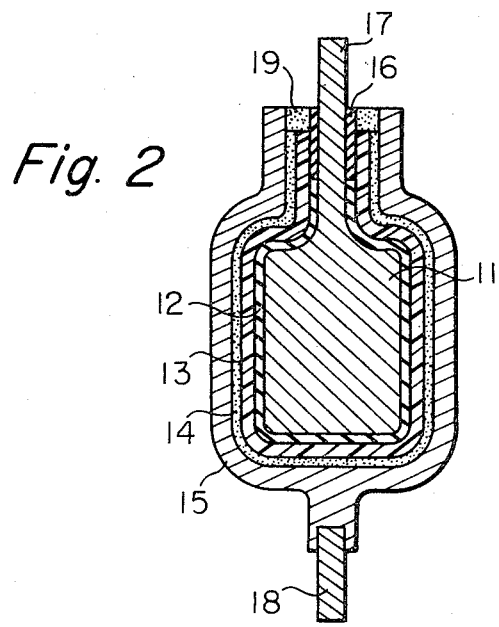

These and other objects of this invention will become apparent from the following description taken in conjunction with the accompanying drawing in which:

FIG. 1 is a perspective view showing an embodiment of a solid electrolyte capacitor according to this invention; and FIG. 2 is a vertical cross-sectional view taken on line 2—2 of FIG. 1.

In general, these objects of this invention are attained by a solid electrolyte capacitor comprising a valve-metal anode electrode preliminarily coated with a particular oxide dielectric film, a cathode electrode, and a layer sandwiched between the anode and cathode electrodes and composed of a solid electrolyte. The electrolyte includes an organic semiconductive compound consisting of TCNQ and TCNQ complexes, and a polymer which is less than 40 percent by weight of the total solid. In this solid electrolyte, the polymer does not dissolve the TCNQ or TCNQ complexes, but fine particles or crystals of TCNQ or TCNQ complexes are uniformly dispersed therein. If desired, the solid electrolyte may further includes a powder of a conductive material such as carbon black so as to increase the conductivity thereof.

Referring now to FIG. 1, a capacitor 10 is shown to be of the usual pellet type by way of example. The construction of the capacitor is shown in detail in the enlarged cross-sectional view in FIG. 2, in which an anodizable metal foil or an anode electrode 11 has a thin and dense dielectric oxide film 12 on the surface thereof. The surface of the dielectric oxide film 12 is covered with a solid electrolyte 13 including an electrically conductive mixture of a TCNQ complex and a polymer which will be described in more detail hereinafter.

To fix the anode electrode 11 in the capacitor and to provide improved electrical contact with a metal casing 15 which is integral with an aluminium foil of a cathode electrode 18, the entire surface of the solid electrolyte layer 13 is coated with a conductive material 14 such as silver paste or colloidal graphite by any conventional method.

Electrical lead 17 in direct electrical contact with the anodizable metal foil 11 and may be an extension thereof. The lead 17 has an insulating paint 16 so as to insulate the lead 17 from the solid electrolyte 13. An adhesive 19 surrounds the insulating paint 16 so as to seal the metal casing 15.

The anodizable metal foil 11 may be either a plain metal foil such as aluminium, titanium, tantalum, niobium or other suitable anodizable metals, or may be the same metal etched before anodizing to such a degree as is desired to increase the surface area of the metal foil as well known in the art. The dielectric oxide film is formed on the plain or etched foil 11 by anodization treatment so that an adherent, dense dielectric oxide film is produced over the entire surface of the foil except that portion of the lead 17 which is required for providing an electrical connection.

The solid electrolyte 13 of the capacitor according to this invention includes a TCNQ complex more than 60 percent by weight and a polymer up to 40 percent by weight having the TCNQ complex dispersed, not dissolved, therein as above-mentioned. In order to provide a sufficient ionic conductivity, the TCNQ complex should be ionically bonded to a donor material such as having a relatively low ionization potential, e.g., aromatic diamine, substituted ammonium ion, metal onium ion, etc. The aromatic diamine-TCNQ is an ionically weakly bonded crystal and ammonium-TCNQ, on the other hand, is a ionically completely bonded crystal, which is represented by $NH^+TCNQ^-$.

The TCNQ EDA complex to be used for the electrolyte for implementing this invention can be prepared by a method described in J. Am Chem. Soc., vol. 84, pages 3,374 – 3,387 (1962) which is herein incorporated as reference.

The polymer should be capable of desirably dispersing therein the TCNQ complex as above-discussed and therefore selected from a polyamide such as 6-nylon, polyvinylpyrrolidone or the like, a cellulose derivative such as cellulose acetate, cellulose propionate, cellulose butylate or the like, a polyvinyl resin such as polyvinylacetate, polyvinylchloride or the like a synthetic rubber such as polybutadiene, polychloroprene or the like, and so on.

If desired, the solid electrolyte may further includes an electric conductive material such as metal powder and/or carbon black so as to increase the conductivity of the electrolyte.

In this instance, it is to be noted that, since the electrolyte of this invention includes the polymer in a reduced proportion, the properties inherent in the TCNQ salt suitable for the electrolyte are not impaired by the property of the polymer, so that the electrolyte has such excellent properties as low specific resistance, high yield of capacitance, increased anodizability, low expansion coefficient, etc.

Some preferred methods for producing the solid electrolyte of this invention are described. In one of such preferred methods, the solid electrolyte is:

produced by first preparing an anode electrode having a dielectric oxide film, a cathode electrode, a TCNQ complex, a polymer which is capable of dispersing the TCNQ complex, and a solvent capable of dissolving the TCNQ complex and the polymer. The TCNQ complex and the polymer are then uniformly dissolved in the solvent and the oxide film is coated with the solution.

The solvent is evaporated so as to form a solid electrolytic layer on the film and the cathode electrode is brought into constant with the electrolyte layer, thereby obtaining the solid electrolyte.

In the above method, the TCNQ complex, the polymer and the solvent are preferably used in combinations of benzidine-TCNQ, 6-nylon and dimethylformamide; p-phenylenediamine-TCNQ, polymethylmethancrylate and dimethylformamide; triethylammonium-(TCNQ)$_2$, cellulose-acetate and acetone; and so on.

Or otherwise, the solid electrolyte may be produced by preparing an anode having electrode having a dielectric film on its surface, a cathode electrode, a TCNQ complex in the form of fine particles having particle size of 0.1 to 1 $\mu$m, a polymer which can disperse the TCNQ complex, and a solvent which can dissolve the polymer; mixing the TCNQ complex, the polymer and solvent so as to disperse the TCNQ complex in the solution of the polymer and the solvent by using a suitable method; coating the oxide film with the dispersed solution; evaporating the solvent so as to make solid electrolytic layer on the film; and contacting the cathode electrode to the electrolytic layer.

In obtaining a dispersed solution of the fine particles of the TCNQ complex, it is essential that the solvent do not dissolve TCNQ or its complex but dissolve the polymer, and that such solvent should preferably disperse the fine particles of TCNQ or its complex while dispersing the same in the solution and after the anode electrode is coated with the solution.

Accordingly, the solvent should be selected only in terms of the combination of TCNQ or its complex and the polymer. The solvent for effectively dispersing TCNQ or its complex may be water, alchohols, n-hexane, cycohexane, ethylacetate, butylacetate, cellosolve acetate, toluene and the like. However, the solvent employed are limited depending upon the coexisting polymers. For instance, alchohols may be preferably used for 6-nylon, polyvinylpyrrolidone or polyvinylacetate. Ketones which dissolves TCNQ complex to a limited extent are useful for polyvinylchloride or polymethylmethacrylate. Ethylacetate, butylacetate, cellosolve acetate or toluene is used for polyurethanes. Synthetic rubbers are useful for their adhesive abilities to the dielectric oxide film, on which ketones are applied to butadiene rubber, and toluene and xylene to chloroprene rubber.

In more detail, the TCNQ complex, the polymer and the solvent are preferably used in combinations, such as quinolinium-(TCNQ)$_2$,6-nylon and methanol; quinolinium-(TCNQ)$_2$, polyvinylpyrrolidone and water; quinolinium-(TCNQ)$_2$, polyvinylpyrrolidone and methanol; quinolinium-(TCNQ)$_2$, 6-nylon and dimethylformamide; triethylammonium-(TCNQ)$_2$, polyvinylpyrrolidone and a mixture of water and methanol; and so on.

The TCNQ complex powder having the limited particle size is produced preferably by a method including the steps of preparing the TCNQ complex of purified crystals; dissolving the TCNQ complex in a suitable solvent; heating the solution up to a predetermined temperature dropping the heated solution into cool liquid, which is miscible with the solvent but sparingly soluble with the TCNQ complex, so as to re-crystallize the TCNQ complex; and grinding the resultant crystals into fine particle of 0.1 to 1 $\mu$m in size.

Here, the suitable solvent may be, for instance, dimethylformamide, and a mixture of acetone and methanol. The liquid may be water or methanol.

In order that those skilled in the art may better understand this invention, the following example are given by way of the illustration and not by way of limitation.

EXAMPLE I

A solvent was used which dissolved both a TCNQ complex and a polymer. Benzidine-TCNQ (BZ-TCNQ) and 6-nylon were used as the TCNQ complex and the polymer, respectively. The 6-nylon was first dissolved in dimethylformamide and BZ-TCNQ was added to the solution, and thereafter the solution was heated up to 85° C so as to uniformly dissolve both the polymer and BZ-TCNQ.

The solution was applied over a dielectric film of an effective area of 4 cm$^2$ formed at 60 V on a surface of an aluminum anode, and the resultant aluminum anode was heated up to 100° C so as to evaporate dimethylformamide.

A capacitor as shown in FIG. 2 was fabricated with use of the resultant aluminum anode.

Characteristics of the capacitor thus obtained in terms of various ratios of BZ-TCNQ to 6-nylon are shown in Table I, wherein the measurement was carried out at room temperature. Dielectric loss and capacitance were measured by using an electric power of 120 Hz and leakage currents were measured by applying 40 V thereto and in 30 seconds after the beginning of the application.

TABLE I

| BZ-TCNQ % Capacitance by weight ($\mu$F) | Dielectric loss (tan $\delta$) | Leakage current ($\mu$A) |
| --- | --- | --- |
| 20  2.14 | 0.5 | 3.3 |
| 40  5.83 | 0.04 | 0.3 |
| 50  5.94 | 0.03 | 0.2 |
| 60  6.14 | 0.03 | 0.2 |

EXAMPLE II

A solvent was used which dissolved both a TCNQ complex and a polymer. p-phenylenediamine-TCNQ (PD-TCNQ) and polymethylmethacrylate (PMMA) were used as the polymer and the TCNQ complex, respectively. PMMA was first dissolved in dimethylformamide and then PD-TCNQ was uniformly dissolved in the solution. The solution was applied over a dielectric film having an effective area of 4 cm$^2$formed at 60 V on a surface of an aluminum anode, and the aluminum anode was heated up to about 100° C so as to evaporate the solvent.

A capacitor was fabricated with use of the resultant aluminum anode. When the polymer was included in a proportion up to 40 percent by weight of the resultant electrolyte, the capacitance ranged from 5.09 to 5.58 $\mu$F, dielectric loss (tan $\delta$) was 0.04 to 0.05 and the leakage current measured from 0.3 to 1 $\mu$A.

EXAMPLE III

Four parts by weight of cellulose acetate was dissolved in a sufficient amount of acetone and thereafter 6 parts by weight of triethylammonium-(TCNQ)$_2$ was added to the resultant solution. The solution was applied over an oxide film having an effective area of 4 cm$^2$ formed on the surface of an aluminum anode. The anode was heated up to about 60° C. A capacitor using the resultant anode had a capacitance of 5.81 $\mu$F, and a tan $\delta$ value of 0.06. The leakage current measured by 40 V was 1 $\mu$A.

EXAMPLE IV

This example is essentially similar to Example I except that chloroform was used as the solvent.

A capacitor using the resultant anode had a tan $\delta$ value larger than exhibited by the capacitor obtained in Example I. However, when 20 percent by weight of carbon black powder was mixed with the resultant electrolyte, the characteristics of the capacitor became substantially the same as those of the capacitor of Example I.

EXAMPLE V

Quinolinium-(TCNQ)$_2$ prepared by the method described in J. Am. Chem. Soc., 84.3370–3387 (1962), was twice recrystallized. The crystals obtained in this manner were needle crystals having 5 to 15 mm lengths and 1.5 to 100 $\mu$ widths.

One-hundred grams of quinolinium-(TCNQ)$_2$ were dissolved in 4 liters of dimethylformamide. The resultant solution was heated up to 85° C, and was thereafter introduced into a tap funnel and dropped from the tap funnel into cool water (0° C) while stirring the water. Fine quinolinium-(TCNQ)$_2$ crystals were immediately separated due to the difference in solubility of the quinolinium-(TCNQ)$_2$ to dimethylformamide and water. The crystals thus obtained were 1 to 2 $\mu$m in length and 0.5 $\mu$ in width. In order to more finely pulverize the crystals, the crystals were ground for 24 hours in an agate mortar or by means of a ball mill. This grinding operation was achieved by adding 10 ml of a solvent not capable of dissolving the TCNQ complex, e.g. methanol or n-hexane, per 10 grams of the TCNQ complex.

The resultant crystals were cubic or spherical particles having sized less than 1 $\mu$, and had a specific resistance of about 0.5$\Omega$-cm.

EXAMPLE VI

The steps used Example V were followed except in that acetone and methanol were used in lieu of dimethylformamide and water, respectively. The methanol slightly dissolving the TCNQ complex, the sizes of the resultant crystals were 2 to 5 $\mu$. However, the crystals had the same sizes as those discussed in Example V when the temperature of methanol was kept at −50° C.

EXAMPLE VII 6-nylon was used, although various other polyamide resins can be used as the polymer. Quinolinium-(TCNQ)$_2$ and methanol were used, as the TCNQ complex and the solvent, respectively. Quininilium-(TCNQ)$_2$ was purified by recrystallizing by the same method as used in Example V. The purified quinolinium-(TCNQ)$_2$ and 6-nylon were dispersed in a sufficient amount of methanol under an ultrasonic application. The solution was applied over on an aluminum anode electrode having an oxide film having an effective area of 4 cm$^2$ formed thereon at a forming voltage of 100 V. The electrode was heated by hot air, and was then fabricated into a capacitor.

The following Table II shows various characteristics of the capacitors produced in the above method.

TABLE II

| Polymer % by weight | Characteristics measured after sample capacitors are air-dried for 1 hour at 100°C | |
|---|---|---|
| | Capacitance ($\mu$F) | Dielectric loss (tan $\delta$) |
| 50 | 0.15 | 1.22 |
| 40 | 0.23 | 0.07 |
| 20 | 0.28 | 0.03 |
| 10 | 0.31 | 0.03 |
| 5 | 0.46 | 0.04 |
| 0 | 0.20 | 0.07 |

EXAMPLE VIII

Triethylammonium-(TCNQ)$_2$ in the form of fine particles, polyvinylpyrrolidone and a mixture of 1 part by weight of water and 4 parts by weight of methanol were used as the TCNQ complex, polymer and solvent, respectively. Nine parts by weight of triethylammonium-(TCNQ)$_2$ and 1 part by weight of polyvinylpyrrolidone were dispersed in the solvent and the solution was applied over an oxide film having an effective area of 1 cm$^2$ on an anode electrode placed in a vacuum.

Table III shows valves of capacitance of the capacitors produced by the above procedure by changing the particle sizes of the TCNQ complex.

TABLE III

| Metal foil: | Particle sizes of the semiconductive material ($\mu$m) | | |
|---|---|---|---|
| | 1 to 2 | 0.5 to 1 | 0.1 to 0.5 |
| Anodized aluminum etched, anodized aluminum 1 | 0.70 ($\mu$F) | 0.85 ($\mu$F) | 0.90 ($\mu$F) |
| | 1.2 | 3.1 | 5.6 |
| etched, anodized aluminum 2 | 0.90 | 1.3 | 8.8 |
| Anodized tantalum | 0.50 | 0.61 | 0.83 |

It is apparent from the above table that the desired range of the size of the TCNQ complex is from 0.1 to 1 $\mu$m.

EXAMPLE IX

Methylphenadinium-TCNQ in the form of fine particles, cellulose acetate and acetic acid were used as the TCNQ complex, polymer and solvent. One gram of methylphenadinium-TCNQ and 0.1 gram of cellulose acetate were dispersed in 2 ml of acetic acid.

A capacitor was fabricated by using an etched anode electrode having an oxide film with an effective area of 4 cm$^2$ formed by a forming voltage of 50 V. The capacitor had a capacitance of 12 $\mu$F and tan $\delta$ value of 0.01 measured by an a.c. voltage of 120 Hz. The leakage current was below 0.01 $\mu$F at 32 V and about 0.1 $\mu$F at 45 V.

The capacitance remained constant as far as the frequency was below 100 KHz, and decreased proportionately as the frequency increased when the frequency was above 100 KHz. The tan $\delta$ value of the capacitance was constant as far as the frequency was below 5 KHz, and increased above 5 KHz until it reached 1 at 100 KHz.

What is claimed is:

1. An electrolytic capacitor comprising an oxide coated anode electrode, a cathode electrode spaced from said anode electrode, and a solid electrolyte sandwiched between said anode and cathode electrodes, said solid electrolyte containing a 7,7,8,8-tetracyanoquinodimethane complex, and a polymer up to 40 percent by weight of said solid electrolyte and having said 7,7,8,8-tetracyanoquinodimethane complex dispersed therein.

2. An electrolytic capacitor according to claim 1, wherein said electrolyte further comprises fine particles of a conductive material.

3. An electrolytic capacitor according to claim 2, wherein said conductive material is carbon black.

4. An electrolytic capacitor according to claim 1, wherein said 7,7,8,8-tetracyanoquinodimethane complex is in the form of fine particles having particle size of from 0.1 to 1 $\mu$.

5. An electrolytic capacitor according to claim 1, wherein said 7,7,8,8-tetracyanoquinodimethane complex is selected from the group consisting of benzidine-7,7,8,8-tetracyanoquinodimethane, p-phenylenediamine-7,7,8,8-tetracyanoquinodimethane, triethylammonium-(7,7,8,8-tetracyanoquinodimethane)$_2$, quinolinium-(7,7,8,8-tetracyanoquinodimethane)$_2$ and methylphenazinium-7,7,8,8-tetracyanoquinodimethane.

6. An electrolytic capacitor according to claim 1, wherein said polymer is selected from the group consisting of 6-nylon, polyvinylpyrrolidone, cellulose acetate, cellulose propionate, cellulose butylate, polyvinylacetate, polyvinylchloride, polymethylmethacrylate, polybutadiene and polychloroprene.

7. A method for preparing a solid electrolyte capacitor comprising the steps of:
preparing an anode electrode having a dielectric film on its surface and a cathode electrode;
pulverizing a 7,7,8,8-tetracyanoquinodimethane complex into fine particles having particle sizes of 0.1 to 1 $\mu$;
mixing the fine particles of the 7,7,8,8-tetracyanoquinodimethane complex, a polymer capable of dispersing the fine particles of the 7,7,8,8-tetracyanoquinodimethane complex and a solvent for the polymer for dispersing the fine particles of the 7,7,8,8-tetracyanoquinodimethane complex into a solution by a suitable method;
coating the oxide film with the dispersed solution;
evaporating the solvent for forming a solid electrolyte layer on the film; and
contacting the cathode electrode to the solid electrolyte layer.

8. A method according to claim 7, wherein the step of pulverizing the 7,7,8,8-tetracyanoquinodimethane complex comprises:
preparing the 7,7,8,8-tetracyanoquinodimethane complex of purified crystals;
dissolving the 7,7,8,8-tetracyanoquinodimethane complex in a suitable solvent;
heating the solution up to a predetermined temperature;
dropping the heated solution into cool liquid of for recrystallizing the solution; and
grinding the resultant crystals into fine particules of 0.1 to 1 $\mu$ sizes.

9. A method according to claim 7, wherein said 7,7,8,8-tetracyanoquinodimethane complex, polymer and solvent are composed of a combination of quinolinium-(7,7,8,8-tetracyanoquinodimethane)$_2$, 6-nylon and ethanol.

10. A method according to claim 7, wherein said 7,7,8,8-tetracyanoquinodimethane complex, polymer and solvent are composed of a combination of 7,7,8,8-tetracyanoquinodimethane complex, polyvinylpyrrolidone and water.

11. A method according to claim 7, wherein said 7,7,8,8-tetracyanoquinodimethane complex, polymer and solvent are composed of a combination of 7,7,8,8-tetracyanoquinodimethane complex, polyvinylpyrrolidone and methanol.

* * * * *

UNITED STATES PATENT OFFICE
CERTIFICATE OF CORRECTION

Patent No. 3,679,944　　　　　　　　Dated July 25, 1972

Inventor(s) Susumu Yoshimura; Yoshimasa Ito; Shirow Asakawa & Katsue Hasegawa

It is certified that error appears in the above-identified patent and that said Letters Patent are hereby corrected as shown below:

Front Page: after [21] and before [52] insert the following:

--[30]　　Foreign Application Priority Data

September 21, 1970　Japan............45-83142--

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents